United States Patent [19]

Kushner et al.

[11] 4,151,395
[45] Apr. 24, 1979

[54] METHOD AND APPARATUS FOR ELECTRIC ARC AND ANALOGOUS WELDING UNDER PRECISION CONTROL

[75] Inventors: Cherie E. Kushner; Paul A. Tews, both of Columbus, Ohio; Jerome W. Nelson, Houston, Tex.

[73] Assignee: CRC-Crose, International, Inc., Houston, Tex.

[21] Appl. No.: 702,864

[22] Filed: Jul. 6, 1976

[51] Int. Cl.² ............................................. B23K 9/12
[52] U.S. Cl. ........................... 219/125.12; 219/124.34; 219/137 R; 228/8; 228/27
[58] Field of Search ............. 219/124, 125 R, 125 PL, 219/137 R, 125.12, 124.34; 228/8, 9, 10, 11, 12, 27, 28; 318/569, 576, 635, 650, 652, 686, 127

[56] References Cited

U.S. PATENT DOCUMENTS

| | | | |
|---|---|---|---|
| 3,179,786 | 4/1965 | Greene | 219/125 PL |
| 3,346,807 | 10/1967 | Wood et al. | 219/125 PL |
| 3,484,667 | 12/1969 | Wofsey | 219/125 PL |
| 3,621,183 | 11/1971 | Chambonnet | 219/125 PL |
| 3,646,309 | 2/1972 | Smith, Jr. et al. | 318/576 |

FOREIGN PATENT DOCUMENTS

| | | | |
|---|---|---|---|
| 288189 | 2/1971 | U.S.S.R. | 219/124 |
| 253974 | 4/1970 | U.S.S.R. | 219/137 R |

Primary Examiner—J. V. Truhe
Assistant Examiner—Clifford C. Shaw
Attorney, Agent, or Firm—Edwin M. Thomas

[57] ABSTRACT

Signals which contain components that vary with the lateral position of an electric welding instrument as it travels along a weld path between opposite work pieces are obtained from the arc or other heat source and are first processed to remove confusing or nonsignificant components. The processed signals are then compared or combined with each other, or with other signals of predetermined value, to obtain outputs which can be used to determine or control the lateral position or movement of the welding instrument along the weld path. Specifically, in electric arc welding of metals, signals from an electrical characteristic at the arc, such as arc current, which include a component indicative of lateral position of the welding instrument with respect to one or more sidewalls, are first filtered and processed to remove undesirable components. Under control of separate timing signals, the processed signals so obtained are sampled to derive and hold peak values indicative of extreme lateral positions of the instrument as it moves from side to side of its main travel path. By using deliberately timed control signals, these peak values are compared with each other, and/or combined or compared with other signals of known value, to obtain as output the desired position-control signals. The latter are used to indicate, control and/or to change an extreme lateral position of the instrument either by correcting its centerline of main travel and/or by modifying the width or amplitude of its lateral reciprocation.

23 Claims, 8 Drawing Figures

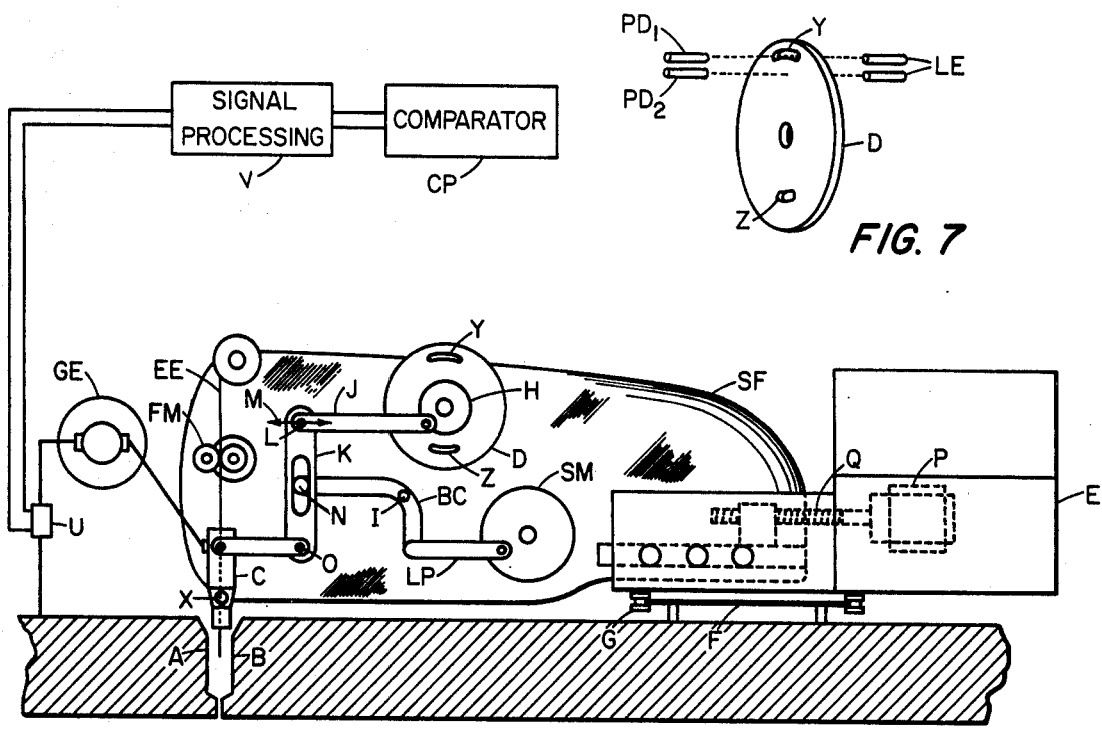
FIG. 7
FIG. 1
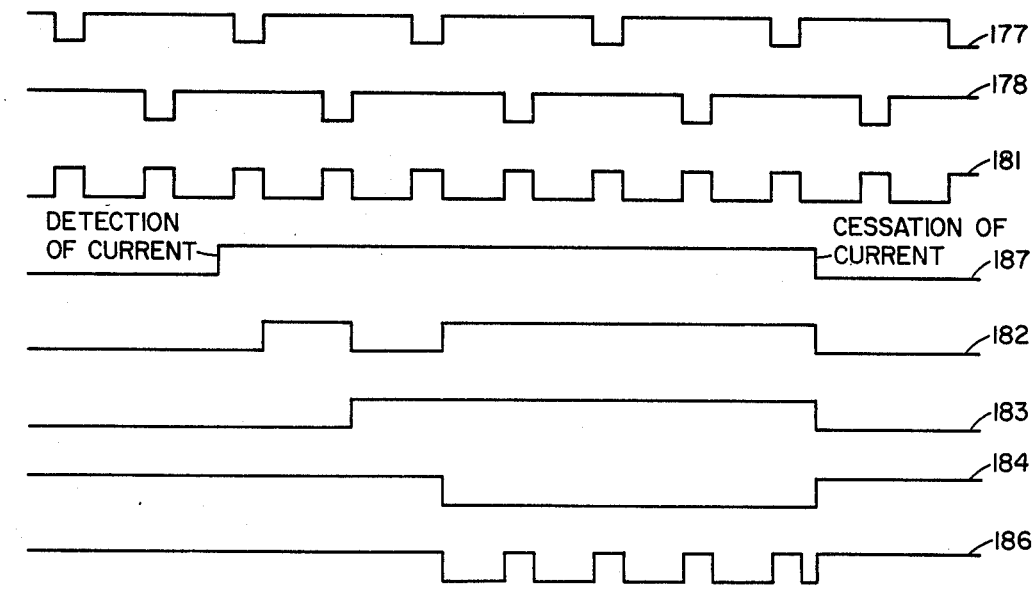
FIG. 6

METHOD AND APPARATUS FOR ELECTRIC ARC AND ANALOGOUS WELDING UNDER PRECISION CONTROL

BACKGROUND AND PRIOR ART

In welding joints or filling gaps along a predetermined path between work pieces, such as flat or curved plates, bars, etc., in edge-to-edge or in cornered relationship, and in joining annular parts such as large pipe sections together in end-to-end relationship, it has been a common practice to move a welding heat source, such as an arc welding torch or like instrument along a predetermined weld path, relative to the work, while fusing and depositing filler metal in the gap from a consumable electrode source. A supply of wire electrode is commonly used as filler material. To produce welds of high quality, the deposited metal must be well and uniformly bonded to the underlying metal and to the respective walls or side elements. Welding machines have been designed to travel in accurately guided paths, but at best, precise and continuous alignment with the weld path is difficult to achieve. Also, where the gap or space to be filled is of appreciable width, it is common practice to reciprocate or oscillate the arc or other heat source laterally back and forth across the main travel path as it travels along the main or predetermined path. Accurate control of the amplitude of such lateral movement is often difficult to achieve, although various methods to do so have been proposed in U.S. Pat. Nos. 3,748,433, 3,775,582, 3,777,115, 3,832,522, and others. It is difficult, also, to keep the welding head or torch travelling with precision along the centerline of the weld path, even though many devices have been proposed for this purpose, as in several U.S. patents, including Nos. 3,084,246, 3,268,707, 3,855,446, and others. Other proposals have been made to correct certain other welding variables by using signals generated in the process to initiate correction as in U.S. Pat. Nos. 3,646,309 and 3,646,311. None of these, however, is suitable for the particular purposes of the present invention.

In recent years, electric arc welding devices, which are relatively small and light in weight and which, under favorable conditions, are capable of making high precision welds have been developed and used quite successfully. As long as they are operated by highly skilled operators, their performance usually is satisfactory. One example of equipment designed particularly for welding annular pipe joints, is described in U.S. Pat. No. 3,806,694. However, even the best of these devices may tend to wander from a true centerline path at times and their oscillation patterns or amplitudes are not always suitable for high quality welds. This is particularly true when the operators are not alert or skillful to observe and correct early minor trends towards misalignment or improper oscillation amplitude. Even with the best of equipment, faulty welds may result from minor deviations from an optimum weld path and/or by an improper oscillation amplitude. An object of the present invention is to monitor and/or to avoid or correct such faults.

As will be explained further, below, the invention is broadly applicable to control of welding instrument position alongside a single upraised wall. In the more common case, which will be further explained, the instrument is to be moved along a gap between two parallel spaced upraised walls for depositing metal in the gap between them.

Another object of the present invention is to design equipment that will be kept automatically in precise path alignment and/or will maintain optimum lateral travel paths, without requiring constant attention and control by a skilled human operator. A more particular object is to make available relatively simple equipment, of small size and mass, which can be incorporated into existing commercial welding devices, such as that described in the above mentioned U.S. Pat. No. 3,806,694, although the invention is by no means limited to pipeline welding. Other objects and advantages will be manifest after the following detailed description is given and understood.

BRIEF DESCRIPTION OF DRAWINGS

FIG. 1 shows schematically a preferred embodiment of a welding apparatus and position control means therefore, including a framentary showing of work elements to be welded.

FIG. 6 is a timing diagram showing the relationship of various signals used in the present invention.

FIG. 7 shows a detail of a timing element used for generating timed logic signals.

DESCRIPTION OF PREFERRED EMBODIMENTS

Figure 2:
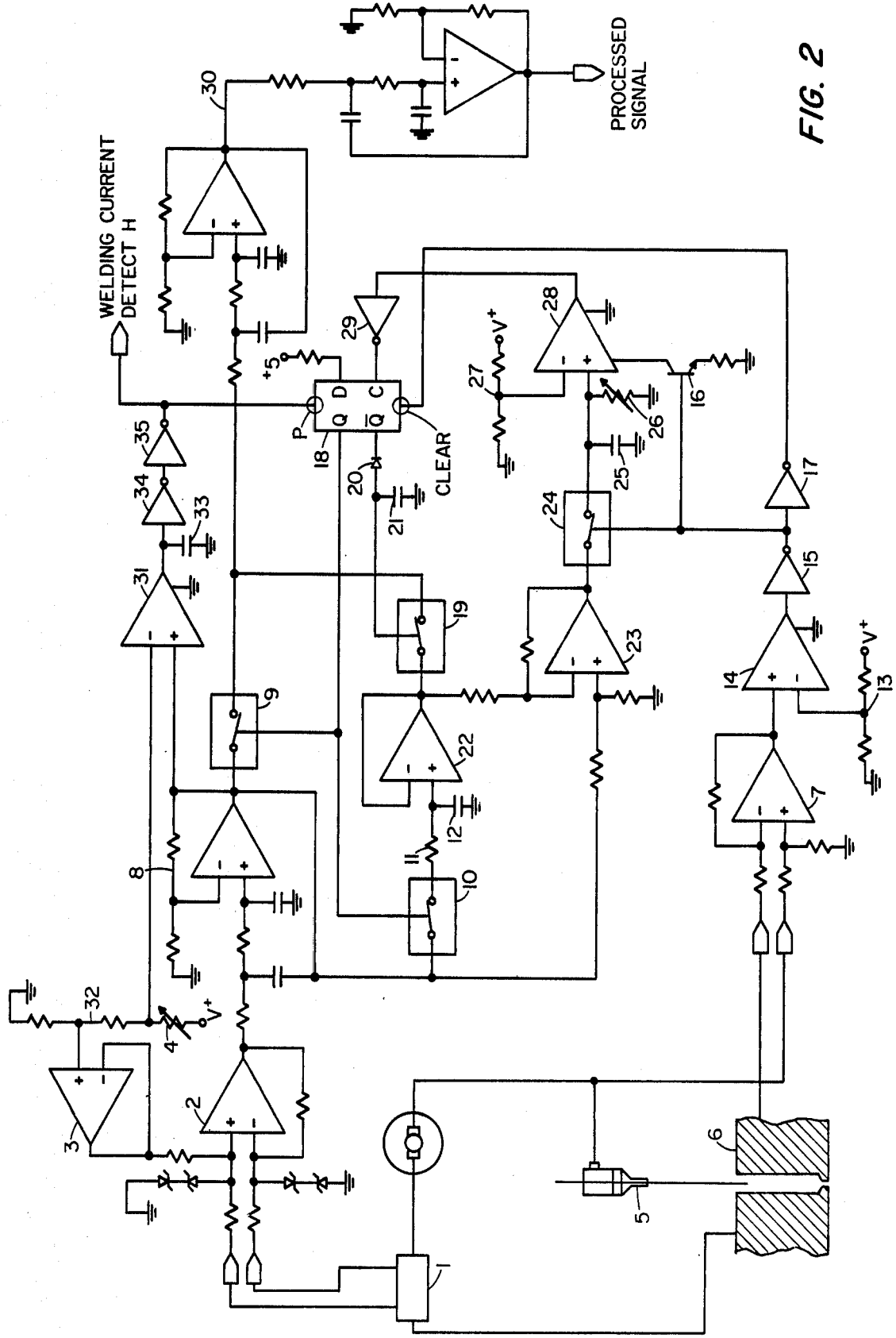
FIG. 2 shows schematically circuitry for processing electronic signals from the weld heat source (electric arc in this case), including circuitry to remove unwanted components.

Referring first to FIG. 1, there is shown diagrammatically an arrangement for taking certain signals, at timed intervals, from electrical characteristics at the arc or analogous heat source and using them, after appropriate conditioning or processing, to control certain mechanical aspects of the welding apparatus which is used to fill with molten metal a gap having relatively upraised spaced wall elements A and B. A conventional arc welding head or contact tube is shown at C, arranged to oscillate or reciprocate about a pivot point X which may be movable with respect to the gap A, B. In FIG. 1, point X and other parts are made bodily movable transversely of the gap, as will be further explained. The welding head C and certain mechanisms associated with it for controlling its position with respect to the work are all mounted on a traveling carriage E which, for one example, may be of the general type shown in U.S. Pat. No. 3,806,694, or may be of a type more suitble for welding joints or gaps between straight line elements such as the edges of steel plates which are to be joined by the weld, etc.

Carriage E is shown as being movable along a guide track F, having flanged guiding and/or driving rollers G, an arrangement well known in the prior art. Other guide means can be used. Mechanical means, also of known type, are provided for reciprocating the instrument C back and forth laterally of its main travel path, as it moves along such path. As shown in FIG. 1, which is only exemplary, a rotary driver H operates a pitman J connected to the upper end of a bar or lever K. At its upper end, lever K bears a roller L which moves back and forth in a horizontal guide path M. The driver H, guide path M, and the pivot axis X for instrument C are all mounted on a subframe SF which is supported for slidable left and right movement with respect to the carriage E. A bell crank BC pivoted at I to the subframe bears a pivotal axle element N at its left end which rides in a slot in lever K. By raising the pivot axle N in this slot, the center of reciprocation of the arm K is changed and, consequently, the amplitude of movement at its lower end can be adjusted. Since the lower end of lever K is connected at O to the welding instrument, the angle and amplitude of swing or reciprocation of the instruement is made variable and adjustable. Bell crank BC can be moved to shift the axle N up or down, by a DC motor SM connected to the lower arm of the bell crank through a link or pitman LP.

The subframe SF can be shifted to right or left by a DC reversible motor P mounted on carriage E. Motor P drives screw Q to shift the subframe SF which is slidably mounted on the carriage E. The means by which motors SM and P are controlled will be more particularly described hereinafter.

Mounted on the same shaft as oscillator drive member H is a timing means which includes a rotating disc D having two accurate slots Y and Z, one of which is placed nearer the center of the disc than the other. See FIG. 7. At the same radial distance of each of these slots is placed a light emitting device LE, which transmits a light beam to a light detector $PD_1$ or $PD_2$ on the opposite side of the disc when a slot permits such passage. The signals so obtained are sent to a logic circuit which generates five main signals referenced to the oscillation of the arc. These signals are used to control the operation of a comparator circuit and two arc position translation circuits as will be described below.

Figure 5:
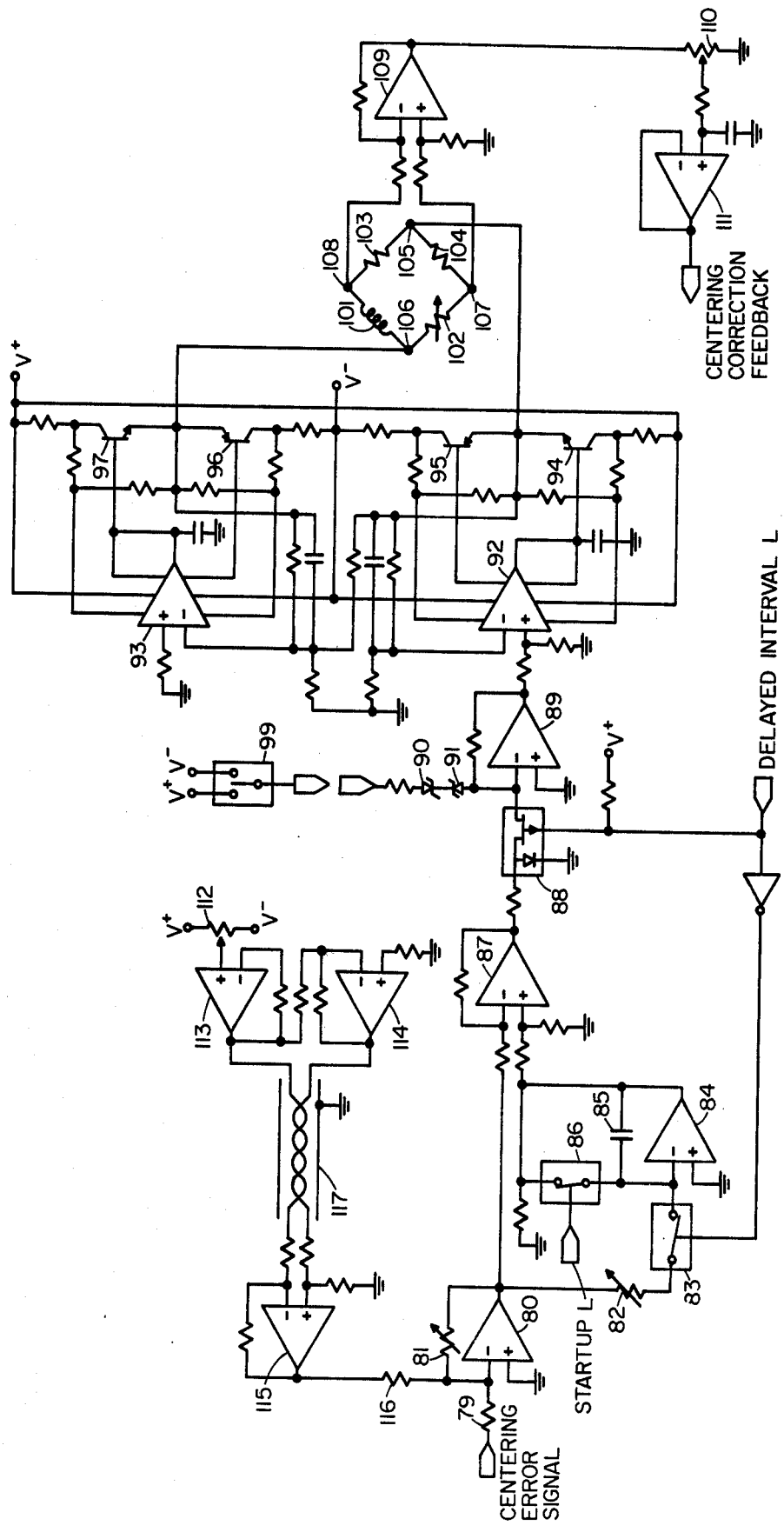
FIG. 5 shows a circuit for proportionally controlling a motor for correcting reciprocation center point location or reciprocation width. The circuitry additionally provides for manual motor operation, for integration of the proportional input signal, for biasing of the input signal, and for output of a back EMF signal.
Figure 8:
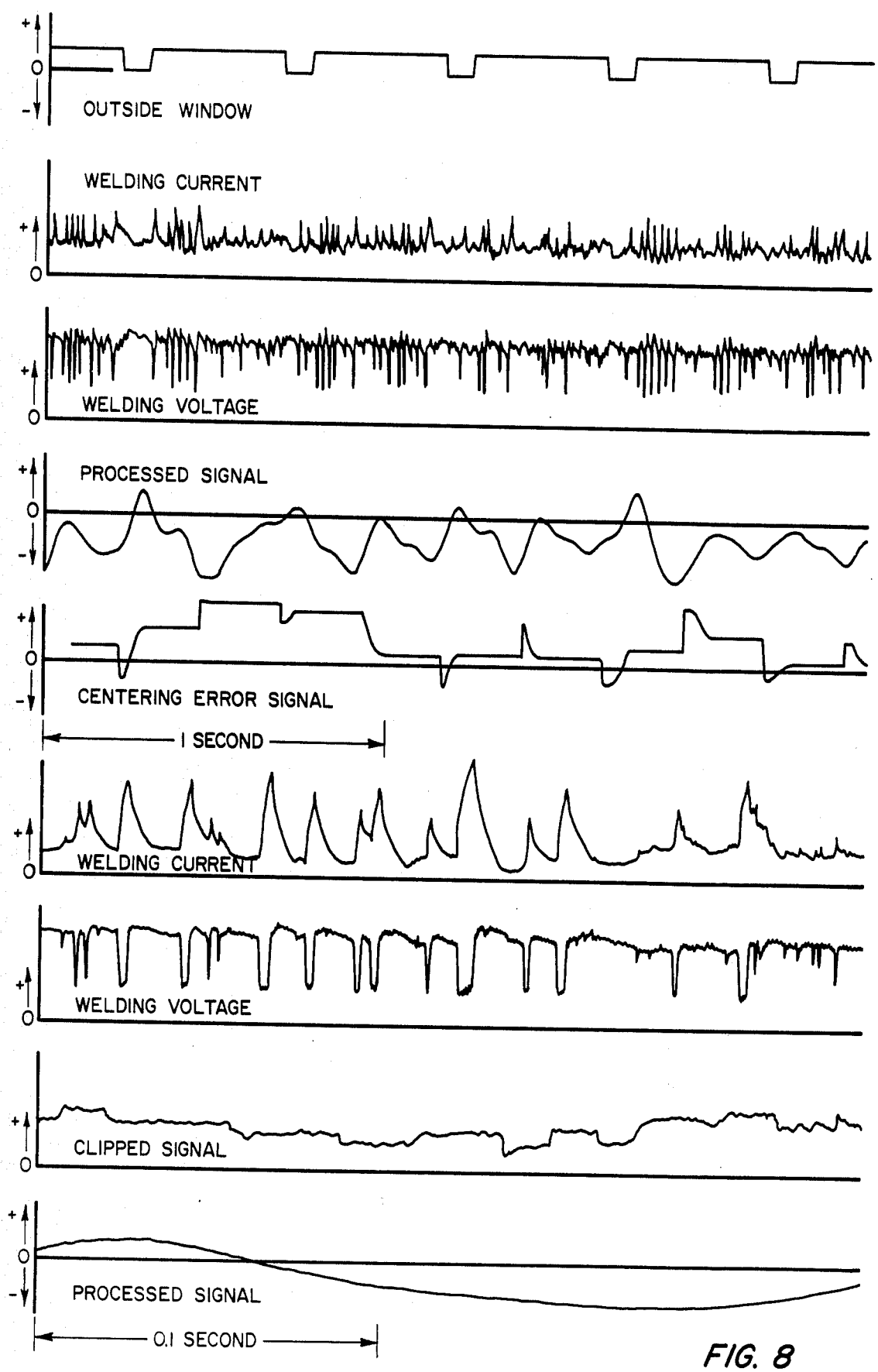
FIG. 8 shows representative traces obtained on a strip chart recorder, showing the types of signals involved in this invention.

In the ground line from the work piece to the generator GE, a shunt U is installed to pick up signals from the arc which are proportional to welding current. In a typical case, this raw signal has an amplitude of one volt per 300 amperes of welding current. Signals so obtained are transmitted to a signal processing circuit V where the more undesirable or confusing elements of the signal are removed by filtering and anotherprocess as will be described in further detail. The processed current signal is fed to a comparator circuit, CP, which, in conjunction with the timing signals, produces signals proportional to the error in centering of oscillation and width of oscillation. The two error signals so derived may be used for monitoring performance, or may be connected to circuitry such as shown in FIG. 5 which translates or corrects the centering and width of oscillation of the arc.

Briefly, the system so far described operates as follows: A consumable wire electrode EE is passed to and through the head C by conventional wire feed roller means, mounted on subframe SF and driven by their own motor FM. Meanwhile, the head or torch is conveyed along the main path by carriage E on which it is mounted. The torch or head C is oscillated or reciprocated from side to side by means H, J, K, O, so that the molten metal at the arc will be properly deposited in the groove or gap and bond to the sidewalls A and B. If the arc does not move close enough to a sidewall, the bond will be deficient; if it moves too far into the wall, damage may be caused.

It is to be understood that an electrical characteristic at the head or torch, such as the welding current, for example, provides a continuous signal having various components, one or more of which may be useful to indicate the lateral position of the torch in the gap and others which will tend to obscure, confuse or mask this useful indicating component. Instead of current, some other characteristic such as voltage, power, sound, light at the arc, or a combination of these may be used. In the present case, it is convenient to use a combination of current and voltage signals.

The raw current signal is next processed under control of the voltage signal to remove at least some of the components or noise which tend to confuse or mask the useful indicator signal, after which the at least partially clarified signal is taken to a comparator circuit, to be compared with a standard, such as the comparable signal at the other side of the path or with a fixed voltage signal, etc. It is known in the prior art, as in the U.S. Pat. No. 3,646,309, mentioned above, how to take a continuous signal from an electrical characteristic at the heat source for another purpose. The present invention uses the signal differently and requires that timed signals be taken at the extreme positions and used to recognize, hold and control certain peak values of the processed signal in a manner that has not been known hitherto, as far as applicants are aware. The selected and held values are gated under control of logic signals and other circuitry to carry out functions including automatic control of the lateral extreme positions so as to keep the instrument on track and operating properly.

Electrical and Electronic Circuitry

This invention for lateral positional control of an instrument for electric welding of metals, is described as applied to the control of an electric arc oscillating laterally within a welding joint or in a gap between work pieces while the welding apparatus travels along a main weld path. The invention may also be applied to the situation where an arc is oscillated laterally in the same plane as one work piece and at an angle to the second work piece such that control of position is relative to only the second work piece. As will be shown, the latter situation is a subordinate variation of the former, and as such may be controlled by the same embodiment of this invention. While control of the lateral position of the arc relative to the workpieces is the objective of this invention, certain factors dictate that control be effected along, (by projection on), two orthogonal axes. One of these factors is that with a welding joint having vertical or nearly vertical sidewalls, the arc usually will be oscillated about a pivot point such that the wire electrode is not parallel to the joint sidewalls at the extremes of oscillation. Thus the pivot point, which is the center of oscillation of the arc, may need to be translated to maintain the proper electrode to workpiece angle. The lateral extremes of oscillation cannot simply be adjusted about a fixed pivot point. Another factor derives from the delay necessarily introduced by the process of isolating from other extraneous signals, a signal proportional to lateral arc position, as described below.

In a presently preferred embodiment, use of a signal as obtained from the arc current will be described. As applied to automatic centering and width control of the usual gas metal-arc welding process with respect to the welding joint sidewalls, this invention utilizes the principle that the average value of welding current increases as a laterally oscillating arc approaches each sidewall. Accordingly, a useful signal may be obtained from a shunt in the welding current line. The value of welding current, or the proportional signal taken for this purpose, however, is not immediately applicable to the control of an arc positioning mechanism. Due to several noise sources, the instantaneous value of such a current signal, which is directly proportional to the actual welding current, has almost no correlation to arc position relative to the sidewalls. With suitable processing as incorporated in this invention, portions of this noise may be removed. This of necessity introduces a time delay into the obtained signals. Accordingly, the immediate value of the processed current signal cannot be used directly to control the turnaround point of arc oscillation as it might in a more ideal situation. Rather, this invention uses a mechanically generated oscillation, the centering and width of which is modified by control signals after each excursion of the arc towards a joint sidewall.

The first conceptual section of this invention processes a signal, derived from the welding current, along with a welding voltage signal, to remove two major sources of noise. The first source of noise is the welding generator itself. Depending on the particular generator in use, there may be oscillations at various frequencies greater than the frequency of arc oscillation. The latter, obviously, is superimposed on the welding current signal. This noise is removed, at least to a substantial degree, by low-pass, sharp cutoff, linear filtering. A second noise source derives from the "short arc" welding process in which a consumable electrode wire is fed into the arc at a rate faster than the arc can consume it. In this process, the electrode intermittently and repeatedly shorts out against the molten metal pool. This extinguishes the arc momentarily and then reestablishes it many times per second. Each time the arc extinguishes, a surge of current begins to grow to several times that of the constant arcing value. At an elevated current level, the resistance heating of the wire electrode from the contact tip of the welding torch to the work piece is sufficient to quickly melt the wire and reestablish the arc. When the arc is reestablished, the value of welding current returns to a constant arcing level. Thus a continuous signal of a widely varying amplitude is produced at the arc.

The current spikes resulting from this short arc process, as just described, are affected by the oscillation of the arc so that they may vary in amplitude, duration, and occurrence. These variations introduce noise at essentially or nearly the same frequency as the oscillation of the arc itself. The amplitude of this noise may be comparable to the amplitude of the meaningful information signal, (of arc position). While the signal-processing circuitry of this invention includes linear filtering, such filtering per se may not be adequate because the filtering cannot distinguish between noise and useful signals which have essentially the same frequency. Accordingly, in addition to filtering, this invention incorporates a stage of processing referred to as "clipping". Essentially, the circuitry "clips" off current spikes which are interspersed with or between periods of constant arcing. In the preferred embodiment, the fact that the voltage from contact tip to the work piece drops below a level sufficient to sustain an arc is used to indicate when to "clip" the current signal.

With certain welding generators, the current spikes may vary in amplitude and/or in frequency in a manner that would mask, to a greater degree than otherwise, the useful signal components if the current spikes were not removed. Regularly spaced current spikes of constant frequency may contribute a definite and more or less constant value to the average current signal value after higher frequencies are removed. This average or base value is automatically removed by subsequent circuitry, and would not otherwise conceal the useful signal components. In the use of certain welding generators, a mode change occurs when the arc is off center and is displaced laterally so that the arc is cutting into a gap sidewall at an extreme lateral position. Current spiking then almost ceases, and likewise, the low-frequency value contributed by the current spikes is no longer present. Hence, though the constant arcing current increases on wall contact, the low-frequency components of the current signal, including spikes, decrease in amplitude. The result is that the current signal, if processed with linear filtering only, would not increase in proportion to the incursion of the arc into a sidewall when the arc is moving too far towards such a wall.

Figure 3:
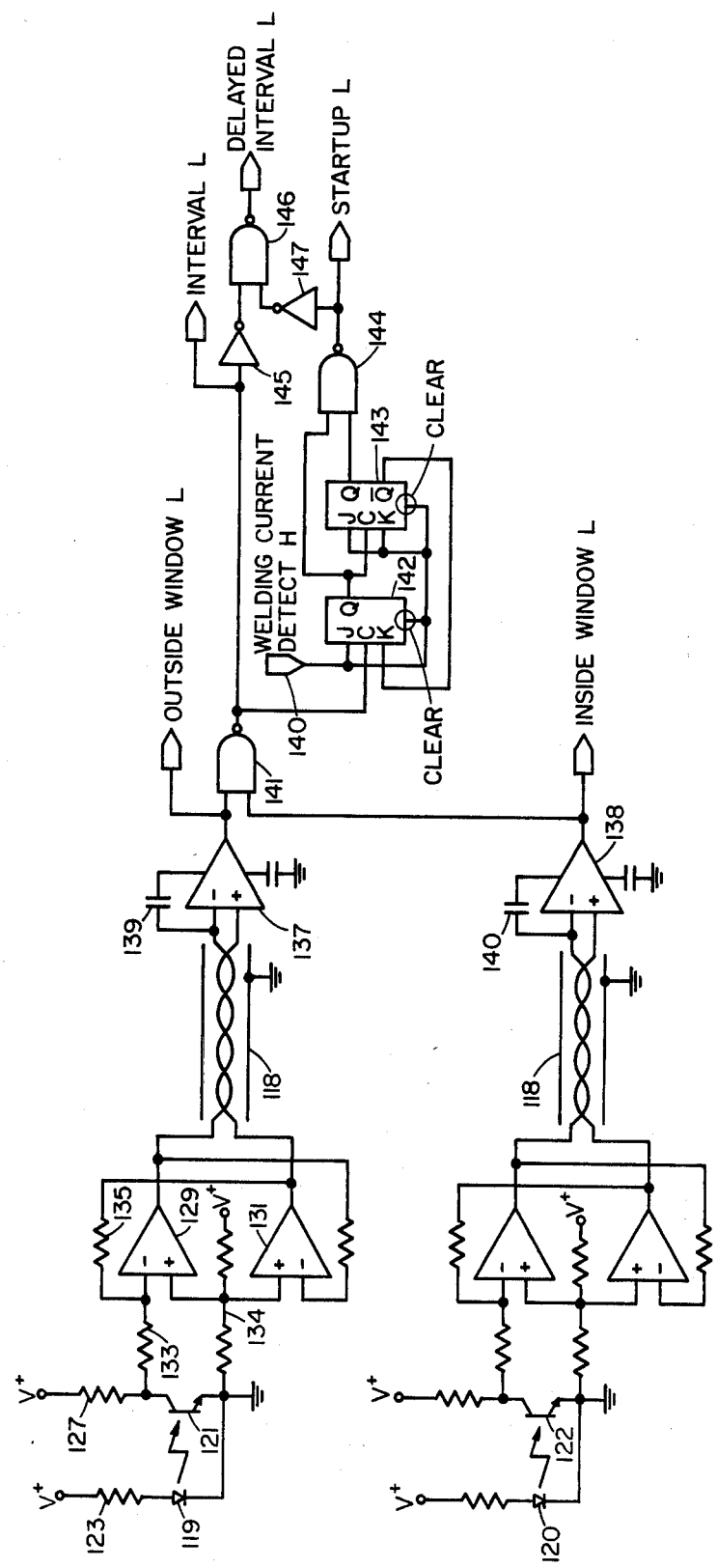
FIG. 3 shows circuitry for generating electronic timing signals directly related to the position of a cam driven reciprocating welding torch.

Referring now to the drawings, including FIG. 1 and particularly FIG. 3, the logic section of this invention generates timing and control signals for the other sections which are referenced to the lateral positional oscillation of the arc. On the same shaft as the driver H which oscillates the torch or contact tip in FIG. 1 is mounted a disc D with two slots which may be referred to as a distributor or sample timer. The two sections of the distributor or timer disc, which correspond to the lateral extremes of oscillation of the arc, are centered in time with the peak value of the processed current signal. On one side of the disc D is a light emitter LE and on the other side is a photodetector PD, FIG. 7. The light beam from the emitter to the detector is transmitted each time a slot Y or Z in the disc passes between the two. Circuitry within the mechanism which transports the welding torch transmits the signals from the slots to logic circuitry which is physically located within the same enclosure as the other sections of this invention.

The logic circuitry decodes the information from the distributor or timed samples and generates five primary timing signals, as mentioned above. The first two are referred to as window signals, one for each extreme of arc oscillation towards a sidewall. They are designated Inside Window, (IW), and Outside Window, (OW). The third signal, Interval, (I), is asserted during the interval between extremes of oscillation of the arc. Specifically, it is asserted when both window signals are unasserted. A fourth signal, Startup (ST) is asserted after three window signals following the initial detection of welding current. This signal, in effect, is used to turn the control mechanism on. The fifth signal, Delayed Interval (DI) is asserted for each interval between sidewall windows after the assertion of Startup.

Figure 4:
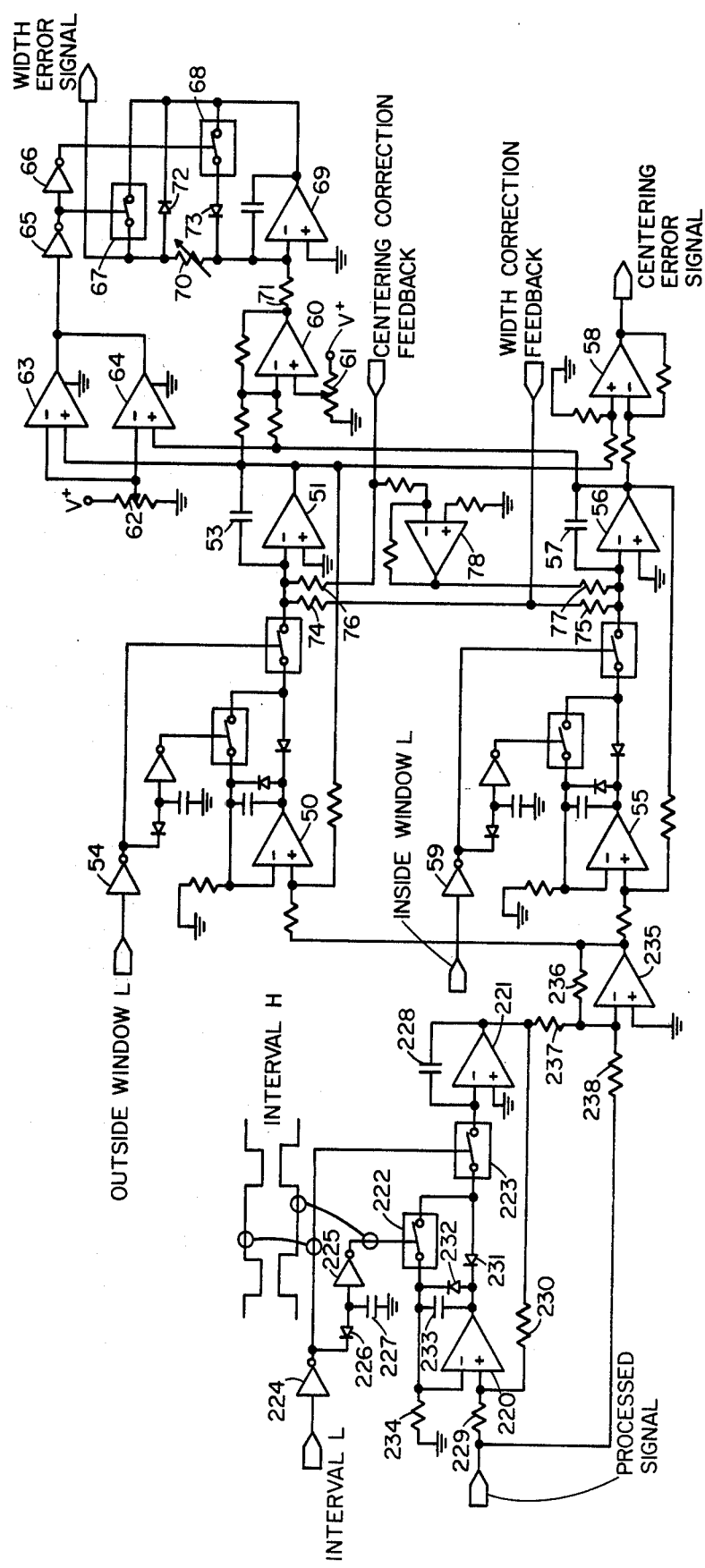
FIG. 4 shows a comparator circuit, which makes further use of the processed signals, timing signals, and back EMF signals to provide error signals for control or monitoring purposes.

In the comparator section of this invention, FIG. 4, two signals are derived from the processed current signal, one for controlling the centering of arc oscillation and the other for controlling the width of oscillation. Each signal represents the magnitude and direction of correction needed. These are referred to as the centering error signal and the width error signal. They are derived from the processed current signal which has the appearance of an oscillation with a peak corresponding to each lateral extreme of oscillation of the arc, modulated on a baseline value. The peak amplitude of the processed current signal during an extreme of arc oscillation above the level of the processed current signal between extremes of oscillation is inversely proportional to the distance between the arc at the given extreme of oscillation and the welding joint sidewall or upraised element on the same side.

Let the peak more or less normal value of current above the value of current during the interval between extremes of arc oscillation be referred to as a current surge. If the current surge corresponding to one sidewall is equal to the current surge corresponding to the previous sidewall, then the oscillation of the arc is centered. In this case the difference between current surges is zero. Similarly, the difference, (plus or minus), between two sequential current surges from opposite sidewalls is proportional to the error in centering of the arc oscillation. This difference is the centering error signal.

That the width of arc oscillation is proper is equivalent to the fact that the arc approaches to within a certain or proper distance of both sidewalls. This is indicated by the current surges from both sidewalls being of a certain specific amplitude. If the current surge from one sidewall is less than desired, while the current surge from the other sidewall is more, (as a result of an error in centering), then proper width is indicated by the fact that the sum of the current surges from opposite sidewalls is of a certain amplitude. Accordingly, the width error signal is the result of summing the current surges from opposite sidewalls and then subtracting a set point value.

In order to obtain the difference in the value of processed current during different periods of arc oscillation, it is necessary to sample and hold the value of current from one period of time for comparison with the value of current during later periods. As already described, three timed periodic signals are generated in the logic section from the oscillation of the arc. The two window signals which overlap the peak value of the processed current signal correspond in time to one or the other lateral extreme of arc oscillation. The third or Interval signal is asserted during the period between window signals. These three signals each control the operation of a separate peak sample and hold circuit. While the Interval signal is asserted, the minimum (negative peak) value of the processed current signal is sampled and the value thus obtained is held during the next window signal. For each window signal, the difference between the peak value of current during the window signal and the minimum value of current during the previous interval is sampled, while the window signal is asserted, by the peak sample and hold circuit controlled by that window signal. The current surges acquired in this manner are held until the next occurrence of the same window signal. The centering error signal is then derived by subtracting the current surge corresponding to one sidewall from the current surge corresponding to the other. To derive the width error signal, the current surges corresponding to both sidewalls are added and inverted and then subtracted from a negative setpoint value. The algebraic result in the sum of the two current surges minus a setpoint value.

The method of extracting current surges from the processed current signal by subtracting the minimum value of the current signal during the interval signal from the maximum value during a window signal is analogous to high pass filtering. The processed current signal has components at the frequency of the oscillation of the arc which correspond to the lateral position of the arc, plus components at lower frequencies, including zero. The comparison of the current signal from two different points in time, essentially removes all constant and slowly varying components of the current signal.

If it is desired to control only centering of oscillation of the arc, then the minimum value of current during the interval between extremes of oscillation of the arc does not need to be subtracted from the maximum value of current during an extreme of oscillation before the comparison which generates the arc centering error signal. The minimum value of current during one assertion of the signal Interval, $N_1$, usually differs by only a small amount, e, from the minimum value of current during the next assertion of the signal Interval, $N_2$. That is, $N_1 + e = N_2$. Let the peak value of current during one window signal be called A and the peak value during the other window signal be called B. The centering error signal is given by: $(A-N_1)-(B-N_2)$. This is equivalent to $(A-N_1)-(B-(N_1-e)) = A-B+e$.

The width error signal is valid in three out of four situations, as described below, which are nearly but not exactly equivalent to the fact that the oscillation of the arc is centered to within a certain tolerance. If the arc does not approach to within a minimum distance of one sidewall, so that the peak value of current is not discernably greater than that for the interval between extremes of oscillation, then there is no distinction between the arc approaching the sidewall to within a distance slightly greater than the minimum distance and a distance much greater.

In the first two situations the arc approaches both sidewalls to within a minimum distance such that the amplitudes of the current surges corresponding to both sidewalls are greater than a certain desired or predetermined level. Now whether the sum of the current surges corresponding to both sidewalls is less than or greater than the desired setpoint value, the width of oscillation of the arc is indicated correctly. In the third situation where the current surge corresponding to at least one sidewall is less than a desired or predetermined level and the sum of the current surges corresponding to both sidewalls is less than the desired setpoint value, then the width of oscillation of the arc is too narrow by at least the amount indicated. The fourth situation is the only one in which the direction of correction is indeterminate. It is the same as the third situation except that the sum of the current surges corresponding to both sidewalls is greater than the desired setpoint value. In such case the oscillation of the arc may be either too wide and slightly off center or too narrow and severely off center.

If the current surge corresponding to either sidewall is less than a threshold value, then the width error signal is inhibited from decreasing the width of oscillation of the arc. The width error signal is connected to an operational amplifier, the feedback configuration of which is changed by two switches. The feedback is switched from that for inverting unity gain to that for inverting precision rectification. In other words, the transfer function becomes minus one for negative input voltages and zero for positive input voltages.

The two error signals, as described up to this point, change discontinuously to a new value after the assertion of the two window signals. During the next assertion of the interval signal, these signals are used to correct the centering and width of oscillation of the arc as described later. As soon as a correction in width or centering is made, the values of the current surges from which the two error signals are derived no longer represent the actual width and centering of the arc. Conceptually, the feedback loop which translates arc position into error signals in not closed during the interval between extremes of arc oscillation. Accordingly two additional feedback loops are incorporated within this invention which are active in the interval between sampling of current surges.

Two signals are generated which represent the incremental change in the centering and width of arc oscillation. These signals, one for centering and one for width control, are used to adjust the two stored values of the current surges corresponding to both sidewalls in a manner which is the inverse of that by which the respective centering and width error signals are derived. Specifically, the incremental arc position feedback signal for centering increases the current surge corresponding to the sidewall towards which the center of oscillation is translated and decreases the current surge corresponding to the opposite sidewall. On the other hand, the incremental arc position feedback signal for width increases both current surges if the oscillation is widened and vice versa. The result of incorporating these two incremental arc position feedback signals within this invention is that the two error signals change continuously as the position of the arc is translated. There is no delay until the next current surge is sampled.

The two incremental arc position feedback signals are proportional to the change in centering or width of the oscillation of the arc. They are generated by integrating over time signals derived from the rate of change of arc position. In the preferred embodiment of this invention, the two peak sample and hold circuits, which hold the current surges, are implemented using integrators for the hold function. Thus, the signals which represent the rates of change of centering and width of oscillation of the arc may be integrated using the same circuits which hold the voltage values of the current surges. This automatically combines the current surges with the incremental arc position feedback signals.

The circuitry which produces a signal proportional to motor motion makes use of the fact that a d-c permanent magnet motor generates a voltage opposing the applied voltage which is proportional to motor speed. This opposing voltage is well known as back EMF. Conceptually, the motor coil may be viewed as a fixed resistance in series with a speed-dependent voltage source. In this invention, the motor coil is connected as one leg in a resistance bridge. The bridge is balanced in such a manner that with zero motor motion there is zero voltage difference between two opposing nodes of the bridge. When the motor rotates, the difference in voltage between these nodes is in proportion to the speed of motor motion.

Given that, in the mathematical sense, centering and width are orthogonal control axes, it is consistent to note that the incremental arc position feedback signal from one of the two axes does not affect the error signal for the other within one interval between sampling of current surges. To be specific, differential changes in the two current surges resulting from the incremental arc position feedback signal for centering cancel out in the derivation of the width error signal. In a corresponding manner, identical changes in both current surges resulting from the incremental arc position feedback signal for width are canceled by the subtraction used to derive the centering error signal.

Ideally, the new current surge sampled during the next lateral extreme of oscillation should reflect the change in arc position occurring since the last current surge was sampled. In other words, the new current surge replaces the sum of the last current surge corresponding to one sidewall and the two incremental arc position feedback signals, algebraically signed according to that sidewall. If the current surge corresponding to the opposite sidewall were not adjusted by the incremental arc position feedback signal for an axis, then the change in arc position along that axis, which would be reflected by only the new current surge, would not be canceled out in the derivation of the error signal for the other axis. In other words, a change in centering would interact with the derivation of the width error signal and vice versa. Also, if the current surge not being updated were not adjusted by both incremental arc position feedback signals, then the error signals derived after the other current surge is updated would lag the actual arc position by half the change in arc position during the previous interval between alternate current surge samples. In the derivation of the error signal for an axis, the two current surges may be considered as composed of a value common to both, plus a value which is half the error signal derived from both. Accordingly, the next current surge following a correction in arc position reflects only half the change in arc position during the previous interval.

Incorporation of an incremental arc position feedback loop accomplishes the following: It insures translation of the arc in proportion to the measured error, in the presence of high motor gain, and even nonlinearity of deadband, in the motor speed versus the applied voltage profile. Secondly, by providing feedback of arc position without time delay, it prevents overshoot of center or desired width, resulting from use of an integral term as described later. Thirdly, it compensates for the delay in the measured error term, resulting from correction of arc position between samples.

For controlling both the centering and the width of oscillation of the arc, circuitry is required to translate the two error signals into motion of the mechanisms which position the centering of the arc and govern the width of oscillation. As presently embodied within this invention, the motion of an electric motor generates a correction in arc position for both centering and width of oscillation of the arc. Accordingly, only the circuitry which corrects the centering of oscillation of the arc is described.

The centering translation section of this invention drives the motor, such as P, FIG. 1, which centers the oscillation of the arc. The error signal from the comparator section is scaled by an adjustable factor at the input to this section. The result is referred to as the proportional term. The proportional term is then integrated over time and is referred to as the integral term. These two signals are summed and used to translate the centering of oscillation of the arc, as at P, when the signal, Delayed Interval, is asserted. In other words, motion of this motor is enabled during the interval between sampling of current surges after two current surges from opposite sidewalls have first been sampled. A momentary toggle switch, TS, or 99, FIG. 5, located on the welding apparatus, is provided to translate the pivot point of oscillation for initial manual positioning. This switch is not disabled by the absence of welding current. Subsequent circuitry described in connection with FIG. 5, below, and configured as a bridge output amplifier, generates a differential signal with power sufficient to drive the motor P which translates the pivot point of oscillation. The bridge configuration provides almost full supply voltage for both directions of motor rotation.

The gain of the proportional term is adjusted so that it will not bring about full correction of arc position within one-half of an oscillation cycle. The gain of the integrator is set such that the output of the integrator would approximately equal a constant input signal after an integration period of one full oscillation cycle. The intention of these settings is to maximize response to real offsets without oscillation while minimizing response to measured errors lasting only one-half of an oscillation cycle. Such errors, which are irrelevant, may result from the arc encountering a relatively unimportant conductor, such as sidewall spatter. In this case, the integral term acts as a mechanical analog of mass. The measured error, which is the accelerating force, must continue for a period of time sufficient to produce a centering motion velocity, which would result in a significant correction over time. The integral term also insures that the oscillation of the arc is centered even for a zero value error signal.

In filling the gap between two work pieces, a situation referred to as "high-low" may exist, where the height of the sidewalls on both sides may not be the same, or there may be only one upraised wall, against which metal is to be deposited. In this situation, the oscillating arc may encounter less work piece material on one side than the other as during the last fill pass of the welding apparatus in gap filling. The centering control of this invention would then tend towards the lower (or non-existent) sidewall. To offset this tendency, a bias signal can be added to the centering error signal at the input of the centering translation section. This signal artificially biases the centering of the oscillation of the arc to an extent where the centering error signal cancels the bias signal. As presently embodied, this bias signal is preferably adjusted by a human operator using a potentiometer located on the welding apparatus. Alternatively, it may be derived from transducers contacting both work pieces.

Note that the limiting case for unequal sidewalls is that where no sidewall exists in one lateral direction of oscillation. This is equivalent to the situation where the arc is oscillated horizontally with respect to one work piece and at an angle to a second work piece. In this case, there is no lateral positional information derived from one extreme of arc oscillation. However, the same embodiment of this invention may still be used to control the lateral position of the arc (though a simpler embodiment would suffice), if the bias signal as described above is considered to be a setpoint value. The system would then seek to maintain the current surge from the one extreme of arc oscillation at this setpoint. Of course, in this situation, it is not meaningful to speak of controlling the width of oscillation, and this function must be disabled.

Detailed Description of Circuitry Components

The foregoing general description of this invention has been in terms of the functions accomplished in each of four conceptual sections. The following describes in detail the electrical circuits and other devices which constitute the preferred embodiment of these sections.

The processing of the current signal is accomplished in several stages. Referring to FIG. 2, a current signal is measured with a current shunt 1 (middle left) of approximately 1 volt/300 amperes in the ground return path from the work piece to the welding generator. See also U, FIG. 1, mentioned above. The current signal thus obtained is input through an overvoltage protected differentially configured op amp (operational amplifier) 2. The reference voltage for the non-inverting input of op amp 2 is the output of another op amp 3, which is configured as a voltage follower. The noninverting input of op amp 3 is derived from resistor voltage divider 32 which includes a potentiometer 4. The offset thereby produced in the output of op amp 2 removes a fixed portion of the baseline value of welding current. This allows for subsequent amplification without exceeding the output voltage range of succeeding stages. Welding voltage is measured between the contact tip 5 of the welding torch (lower left) and the work piece 6, and is scaled down by a factor of ten at the input of op amp 7. The current signal is filtered to remove high frequencies by a circuit 8, which forms a two pole Butterworth active filter with an upper 3 db. point of approximately 280 Hz. This signal during constant arcing is connected through a switch 9 to a low pass filter circuit 30 (upper right). The same signal is also connected through a switch 10 and resistor 11 to a capacitor 12.

When an arc extinguishment occurs, the arc voltage, scaled down by a factor of 10, drops below a threshold value set by resistor voltage divider 13 at the input to a voltage comparator 14. This triggers several changes which inititate clipping of the current spike produced by the arc extinguishment. The output of voltage comparator 14 goes low and is inverted twice by inverters 15 and 17. The low output of inverter 17 direct clears a flip flop 18. The Q output of flip flop 18 then goes low and opens switches 9 and 10. This disconnects the current spike from low pass filter 30 and holds a voltage on capacitor 12. Due to the time constant of resistor 11 in combination with capacitor 12, the voltage value stored on capacitor 12 is the value of constant arcing current just prior to arc extinguishment. The stored voltage is buffered by a FET (field effect transistor) input op amp 22. Clearing flip flop 18 also causes its $\overline{Q}$ output to go high. This closes switch 19 after a short time delay introduced by diode 20 and capacitor 21. The stored value of constant arcing current at the output of op amp 22 is now connected to the low pass filter circuit 30.

When the arc is extinguished, the value of welding current does not instantaneously change, due to the equivalent inductance of the welding generator. Instead, the current builds up to a peak value which may be limited by the characteristics of the welding generator. When the arc is reestablished the current falls to a relatively constant arcing level at a negative exponential rate characteristic of the particular welding generator. During the interval when voltage indicates arc extinguishment, the difference between the current spike at the output of filter circuit 8 and the constant arcing current held at the output of op amp 22 is derived at the output of op amp 23. The output of op amp 23 charges capacitor 25 through a switch 24 to the peak value of the current spike above the constant arcing value. During an arc extinguishment, switch 24 is closed by the output of inverter 15. When the arc is reestablished, the voltage on capacitor 25 is drained to ground potential through potentiometer 26. The rate is set to be equivalent to the rate at which current returns to a constant arcing level after a current spike. Different generators may require different settings of potentiometer 26. When the voltage on capacitor 25 falls below a level near ground, set by resistor voltage divider 27, the output of FET input voltage comparator 28 goes low. This signal is inverted by inverter 29 and connected to the clock input (C) of flip flop 18. The rising edge of this signal at the clock (C), input sets flip flop 18 by clocking in the high level maintained at the D input. Setting flip flop 18 places switches 9, 10, and 19 in their initial positions. This completes the clipping of a current spike.

In order for flip flop 18 to be set by the rising edge of the output from inverter 29, the output must first go low. Normally, a current spike charges capacitor 25 above the threshold set at the inverting input of voltage comparator 28, which in turn produces a low level at inverter 29. Occasionally, an arc extinguishment for a very short time may clear flip flop 18 without charging capacitor 25 above the threshold. To guarantee setting of flip flop 18, the output of inverter 15 turns on a transistor 16 when welding voltage drops, thereby strobing high the output of comparator 28 during arc extinguishment, regardless of its inputs.

The low pass filter circuit 30 removes frequency components of the clipped current signal above those at the frequency of arc oscillation which, in a typical case, may be approximately 8 Hz or more broadly 1 to 20 Hz. The circuit is configured as a four pole Chebyshev design with a 0.5 db. peak to peak ripple in the pass band. FET input op amps are used to allow for small capacitor and large resistor values. The processed signal output of filter circuit 30 is the input to the comparator section shown diagramatically in FIG. 2 (see FIG. 4 for more details).

Detection of welding current is also accomplished in the signal processing section. The output of filter circuit 8 is connected to the non-inverting input of a voltage comparator 31. The inverting input is from the node of voltage divider 32 which is connected to potentiometer 4. The voltage at this node is more negative than the voltage at the node connected to the noninverting input of op amp 3 by a factor which is greater than the gain introduced in filter circuit 8. This configuration maintains the setting at the inverting input a fraction of a volt above the zero current value at the output of filter circuit 8 regardless of the setting of potentiometer 4. A negative difference between the inputs of voltage comparator 31 connects its output to ground potential. When a welding current signal from filter circuit 8 produces a positive difference between the inputs of voltage comparator 31, the output no longer sinks current to ground. Capacitor 33 then charges towards 5 volts through a resistor internal to a Schmitt trigger inverter 34. The output of inverter 34 goes low when the voltage on capacitor 33 exceeds approximately 1.7 volts. The resultant delay in indicating presence of welding current is to insure that an arc has been established. The output of inverter 34 is inverted again by another inverter 35. The output of inverter 35 indicates detection of welding current for the P input of flip flop 18 and for the logic section. See FIG. 3 for details of the latter.

The logic section of this invention, FIG. 3, generates timing and control signals for the other sections which are referenced to the lateral positional oscillation of the arc. Referring momentarily to FIG. 1, on the same shaft as the cam which oscillates the torch or contact tip C is mounted the disc D provided with two accurate slots Y and Z. This was referred to above as a distributor or sample timer. The slots Y and Z are at different radial distances from the center of the disc and each extends for about 60° of arc in width. The position of the slots is such that each is centered in time with the peak value of the processed current signal for one or the other lateral extreme of oscillation of the arc. At the radial distance of each slot, there is a light emitter 119 or 120 on one side of the disc and a photodetector 121 or 122 on the other side. A light beam from the emitter to the detector is transmitted each time the respective slot in the disc passes between the two. Circuitry within the mechanism which transports the welding torch transmits the signals from the slots to logic circuitry located within the same enclosure as the circuits which comprise the other sections of this invention.

The logic section of this invention is composed of two circuits as illustrated in FIG. 3. One circuit is located on the welding bug or carriage E, FIG. 1, while the second circuit, within the same enclosure as the other sections, is connected to the first circuit by a control cable 118 (shown as two parallel cable sections in FIG. 3). The circuit in the welding bug has two identical line driving circuits for each of two combination light emitters 119 and 120 and light detectors 121 and 122. These are shown generically in FIG. 7 as photocells $PD_1$ and $PD_2$. Considering now only one emitter, detector, and associated circuit, light emitting diode 119 is connected to a positive voltage supply through a current limiting resistor 123. The beam from emitter 119 impinges on detector 121 whenever a slot (X or Y, FIGS. 1, 7) passes in between. Light detector 121, which in this case is a photo darlington transistor, conducts current through load resistor 127 when illuminated, thereby pulling the voltage at the collector terminal to a low level.

The signal from the collector terminal of light detector 121 is connected to a circuit composed of op amps 129 and 131. The configuration incorporates a Schmitt trigger input with a differential line driving output. The output of op amp 129 connects to the inverting input of op amp 131 which causes the output of op amp 131 to always be opposite that of 129. The voltage at the inverting terminal of op amp 129 is set by the ratio of resistors 133 and 135 to be one-third the output value of op amp 131 plus two-thirds the input signal. The non-inverting terminals of op amps 129 and 131 are held at one-half of supply voltage by resistor voltage divider 134. When the input signal goes less than one-fourth of supply voltage, the outputs of op amps 129 and 131 commutate as the voltage at the inverting input of op amp 129 goes less than the non-inverting input. Now that the output of op amp 131 is low, the input signal must become greater than three-fourths of supply voltage for the output of the op amps to commutate again.

The remaining portion of the logic section which receives signals from the welding bug has two identical differential line receivers 137 and 138. Any noise introduced on control cable 118 will be common to both the wires connected to the inputs of a receiver, whereas the receivers respond only to differences in input voltages. The twisted pair connected to each receiver is terminated for high frequencies with capacitors 139 and 140 in series with resistors internal to the receivers. The outputs of receivers 137 and 138 are respectively the assertion low of signals Outside Window and Inside Window. Waveforms 177, and 178 in FIG. 6 show the output of receivers 137 and 138 respectively.

The logical OR of the two window signals is generated by a nand gate 141 which connects to the clock input of flip flop 142. The output of nand gate 141 is waveform 181 in FIG. 6. Flip flops 142 and 143 are used to generate the signal Startup by counting three window signals following the detection of welding current. Counting three window signals insures that the last two window signals are both preceded by a complete assertion of the signal Inverval. The J and clear inputs of flip flop 142 and the J, K, and clear inputs of flip flop 143 are connected to the signal Current Detect, (waveform 187, FIG. 6), from the signal processing section which is the assertion high of detection of welding current. When these inputs are driven high, flip flop 142 and 143 are enabled to toggle on the falling edge of signals at their clock inputs. The sequence of states for flip flop 142 and flip flop 143 are as follows: Initially they are both low. After the first window signal, 142 toggles high while 143 remains unchanged. After the second window signal 142 toggles low. The falling edge of the Q output of 142 connected to the clock input of 143 toggles 143 high. At this point, the K input of 142, which is connected to the $\overline{Q}$ output of 143, goes low. Without both J and K inputs high, flip flop 142 is not enabled to toggle. After the third window signal the high level at the J input of flip flop 142 is transferred to the Q output while flip flop 143 remains unchanged. Thereafter, window signals do not change the states of the flip flops. The Q outputs of flip flops 142 and 143, (waveforms 182 and 183, FIG. 6), are connected to a nand gate 144, the output of which is assertion low of the signal ST, (Startup), shown in FIG. 6, waveform 184. The output of nand gate 141 is the assertion low of the signal Interval. The signal Interval is inverted by inverter 145 and connected to an input of nand gate 146. The second input of gate 146 is the assertion high of the signal Startup from inverter 147. The output of nand gate 146 is low for the interval between sidewalls after the assertion of Startup as required for the signal Delayed Interval, (waveform 186, FIG. 6).

The comparator section of this invention, FIG. 4, incorporates three identical peak sample and hold circuits, each of which is designed around a pair of operational amplifiers. One circuit, configured around op amps 220 and 221 to acquire negative peak or minimum values, is controlled by the signal Interval. The other two circuits, incorporating op amps 50 and 51 and op amps 55 and 56 are respectively controlled by the signals Outside Window and Inside Window. Each of these circuits is cycled through three modes of operation for each assertion of the logic signal which controls the respective circuit. The three modes of operation are determined by combinations of states of two electronic switches within each circuit. Considering only the first circuit mentioned, for a short period of time following the assertion low of the signal Interval, the output from op amp 221 is reset to the level of the input processed current signal at that time. Immediately thereafter, the circuit is configured to acquire a negative peak value of the current signal. Upon the unassertion of the signal Interval, the circuit holds the negative peak value of current just acquired until the cycle commences again.

The modes of operation of the peak sample and hold circuit associated with op amps 220 and 221 are controlled by switches 222 and 223, FIG. 4. As diagrammed in FIG. 4, each switch is closed for a high level at the control input. The assertion low of the signal Delayed Interval, is inverted by inverter 224 and used to close switch 223. The output of inverter 224 is also connected to the input of Schmitt trigger inverter 225 through diode 226. Capacitor 227 is connected to the input of inverter 225 and to ground. As discussed for detection of welding current, this combination of Schmitt trigger inverter, capacitor, and current sinking only input signal produces a time delay in the transition of the output of inverter 225 to a low level. In turn, switch 222, which is controlled by the output of inverter 225, is maintained closed for a short period of time over-lapping the closure of switch 223. When the signal Interval is unasserted, switch 222 is closed simultaneously with switch 223 being opened.

The processed current signal PS, which is the output of the previous section, FIG. 2 is connected to the non-inverting input of op amp 220 through resistor 229. With switches 222 and 223 closed, the output of op amp 221 is reset to the instantaneous value of the processed current signal. In this configuration, negative feedback is maintained for op amp 220 through switch 222 so that its output equals the voltage at the non-inverting input. Capacitor 233 stabilizes the output of op amp 220 by providing feedback for high frequencies without the forward voltage drop across diodes 231 and 232. The voltage at the non-inverting input of op amp 220, given that the values of resistors 229 and 230 are equal, is half way between the voltage value of the input current signal and the output of op amp 221. As is well known in the art, the output of an operational amplifier configured with a capacitor connected from the output to the inverting input in the same manner as op amp 221, is the negative time integral of the current (in amperes), fed into the node at the inverting input divided in the value of the capacitor (in farads). Accordingly, current from the output of op amp 220 is integrated on capacitor 228 until the output of op amp 221 balances the input current signal so that the voltage at the non-inverting input of op amp 220 is zero. The voltage at the output of op amp 221 is thus minus the value of the input current signal.

When switch 222 opens while switch 223 remains closed, the circuit is configured to sample negative peak values of the input current signal. While the current is decreasing to a minimum, negative feedback for op amp 220 is from the output of op amp 221 through resistor 230 to the non-inverting input of op amp 220. For decreasing values of the processed current signal, the inverting input of op amp 220 is held at ground potential through resistor 234. The output of op amp 221 is thereby constrained to be at minus the value of the processed current signal such that the voltage at the non-inverting input of op amp 220 is also at ground potential. When a negative peak value is acquired and the processed current signal begins increasing, diode 231 prevents the now positive output of op amp 220 from affecting the negative peak value of current held on capacitor 228. Negative feedback for op amp 220 is now through diode 232 so that the output of op amp 220 does not saturate.

The third mode of operation of this circuit is to hold the inverted negative peak value of the input current signal. In this mode, switch 223 is open, which isolates the input of op amp 221 from the rest of the circuit. Op amp 221 has FET inputs which result in very low input bias currents. The inverted negative peak value of the processed current signal present at the output of op amp 221 is accordingly held without change until reset. Also in this mode of operation, switch 222 is closed so that negative feedback is maintained for op amp 220 in the same manner as for the reset mode of operation.

The output of op amp 221 and the processed current signal from the comparator section are added at the inverting input of op amp 235. Due to the inversion of the minimum value of the processed current signal at the output of op amp 221, the algebraic result is that the minimum value of the processed current signal sampled during each assertion of the signal Interval is subtracted from the value of the processed current signal during the next window signal. The output of op amp 235 is then the inversion of this result scaled by the ratio of feedback resistor 236 to equal valued resistors 237 and 238. Accordingly, the increase in current during a window signal above the value between windows signals appears at the output of op amp 235 as a decrease in value from zero.

The output of op amp 235 is connected to the peak sample and hold circuits associated with op amps 50 and 51 and op amps 55 and 56. The operation of these circuits is the same as for the circuit associated with op amps 220 and 221, except that each samples a negative peak value during the assertion low of a window signal. Specifically, the circuit associated with op amps 50 and 51 is controlled by the signal Outside Window connected to the input of inverter 54, and the circuit associated with op amps 55 and 56 is controlled by the signal Inside Window connected to the input of inverter 59. Due to the inversion through the two circuits, the current surge sampled during the signal Outside Window at the output of op amp 51 and the current surge sampled during the signal Inside Window at the output of op amp 56 are both positive valued. The two current surges are compared by differentially configured op amp 58. The output of op amp 58 is the centering error signal.

The two current surges are added at the inverting input of op amp 60 and compared against the setpoint value for width control (derived from potentiometer 61) at the non-inverting input of op amp 60. The two current surges are also compared against a value derived from a potentiometer 62 which corresponds to a minimum permissible or predetermined approach of the oscillation of the arc towards a sidewall as previously discussed. The open collector outputs of voltage comparator 63 and 64 are wire anded at the input of inverter 65 which has an internal pull up resistor. The logical result is that if either current surge is less than the voltage value from potentiometer 62, then the output of inverter 65 is high. The output of inverter 65 is connected to the input of inverter 66 and to the control input of a switch 67. The output of inverter 66 is connected to the control input of switch 68. Normally switch 67 is closed and switch 68 is open. In this case, an op amp 69 is configured as an inverting amplifier with gain proportional to the ratio of a potentiometer 70 to a resistor 71. The output of op amp 60, which is the inverted comparison of the sum of the two current surges against the setpoint value, is inverted again at the output of op amp 69. When either current surge is less than the set minimum value, switch 67 is open and switch 68 is closed. This changes the configuration of op amp 69 to that for precision rectification. For positive inputs to op amp 69 the output is negative so that the feedback path is through a diode 72 and potentiometer 70. The output of the circuit at the node common to diode 72 and potentiometer 70 is the input signal amplified and inverted as before. For negative inputs to op amp 69, the feedback path is through diode 73 such that the output of the circuit is zero. Accordingly, a signal to decrease the width of oscillation at the arc, corresponding to a negative valued input to op amp 69, is not transmitted to the width translation section. The output of this circuit at the node common to diode 72 and potentiometer 70 is the width error signal. The fact that the gain of the error signal may be controlled by potentiometer 70 means that a separate stage of variable amplification is not needed within the width translation section, whereas it is needed within the centering translation section, as described further in FIG. 5.

In the present embodiment of this invention, the signals used to produce the incremental arc position feedback signals are derived from the back EMF signals produced by the motion of the motors which correct the centering and width of oscillation of the arc. Let these two signals be referred to as the centering correction velocity signal and the width correction velocity signal, respectively. For clarity of description, the circuitry which derives the centering correction velocity signal is shown in FIG. 5, and described along with the centering translation section. While not shown, the width correction velocity signal is derived in the same manner.

As described later, motion of the two arc position correction motors is enabled only during each assertion of the signal Delayed Interval. This corresponds to the periods when the inputs of op amps 51 and 56, FIG. 4, are isolated from the rest of their respective circuits. Considering only op amp 51 in combination with capacitor 53, current fed to the node at the inverting input of op amp 51 will be integrated on capacitor 53. The same is true of op amp 56 in combination with capacitor 57. Accordingly, the incremental arc position feedback signal for width is produced by connecting the width correction velocity signal to the inverting inputs of op amps 51 and 56 through resistors 74 and 75 respectively. The incremental feedback signal for width is also thereby summed with the two current surges. In order to affect an increase in one current surge while decreasing the other current surge for a change in centering of oscillation of the arc, the centering correction velocity signal is connected to the inverting input of op amp 51 through resistor 76, and is inverted by op amp 78 before being connected to the inverting input of op amp 56 through resistor 77.

Referring to FIG. 5, the centering error signal is amplified at the input of the centering translation section by an op amp 80, according to the ratio of potentiometer 81 to resistor 79. The output of op amp 80, referred to as the proportional (to centering error) term is connected through potentiometer 82 and switch 83 to the inverting input of op amp 84. The configuration of op amp 84, potentiometer 82, and capacitor 85 is that of an integrator. The output of op amp 84 is the inverted integral, over time, of the proportional term divided by the product of the value of potentiometer 82, (in ohms), and the value of capacitor 85, (in farads). Switch 83 is controlled by the signal Delayed Interval, (DI), from the logic section. While the signal Delayed Interval is unasserted, switch 83 is open, which disables integration of the proportional term while a new current surge is being sampled. Swith 86 is controlled by the signal Startup (ST), also from the logic section. While the Signal Startup is unasserted, capacitor 85 is shorted and the output of op amp 84 is zero.

The inverted integral term from the output of op amp 84 and the proportional term are connected to differentially configured op amp 87. The proportional term is subtracted from the inverted integral term so that the algebraic result at the output of op amp 87 is minus the sum of the proportional term and the integral term. The output of op amp 87 is connected through switch 88 to op amp 89 where it is summed with a manual positioning signal and inverted again. Switch 88 is also controlled by the signal Delayed Interval (DI). While a new current surge is being sampled, switch 88 is open and motion of the motor which corrects centering of the oscillation of the arc is disabled. The manual positioning signal is bi-polar and orginates at a momentary toggle switch 99 on the mechanism which transports the welding torch. This signal is connected to op amp 89 through Zener diodes 90 and 91 which provide a margin against noise being introduced at this point while welding.

The output of op amp 89 is connected through op amp 92 to a bridge output power amplifier circuit which drives the centering correction motor. The output of power operational amplifier 92 is inverted by power op amp 93 so that the circuit has a symmetric differential output with a differential voltage gain of four. Each op amp has two outputs designed to drive the base terminals of a complementary pair of current boost transistors, shown as complementary transistors 94 and 95, and another pair of transistors 96 and 97. Feedback to each op amp is taken from the output nodes common to the emitters of the transistor pair driven by that op amp. The circuit also incorporates sense resistors to limit both the output current and output power.

The two outputs of this circuit are connected to nodes 105 and 106 of a bridge circuit composed of motor coil 101, potentiometer 102, sense resistor 103, and resistor 104. Potentiometer 102 is adjusted to be in the same ratio with respect to resistor 104 as the static resistance of motor coil 101 is with respect to sense resistor 103. With this setting, the voltage difference between nodes 107 and 108 is proportional to the motor back EMF which is a measure of the speed of rotation of the motor. Nodes 107 and 108 are connected to differentially configured op amp 109. The signal proportional to motor back EMF at the output of op amp 109 is scaled down by potentiometer 110, and then low pass filtered and buffered by op amp 111. The output of op amp 111 is the centering correction velocity signal CV used by the comparator section to generate the incremental arc position feedback signal for centering.

The bias signal which is used to adjust the control of centering for unequal sidewall heights or during the last fill pass of the welding apparatus is produced by potentiometer 112. Potentiometer 112 is located within an enclosure on the mechanism which transports the welding torch along with a bridge output amplifier circuit incorporating op amps 113 and 114. The output of this circuit is a symmetric differential signal proportional to the setting, plus or minus, of potentiometer 112. This signal is transmitted over shielded twisted pair 117 to op amp 115 configured for differential inputs within the same enclosure as the other sections of this invention. The output of op amp 115 is connected through resistor 116 to the inverting input of op amp 80 such that the bias signal is summed with the centering error signal. Thus, in a sense, the setting of potentiometer 112 takes the place of or compensates for a low wall or a missing side wall situation, as mentioned above.

The essential functions accomplished in the embodiment of this invention may be realized in other embodiments. In the course of development, alternative implementations of several of the sections into which this invention is divided have been investigated. Within the signal processing section there is an alternative to the use of the arc voltage to initiate clipping of current spikes. Instead, the fact that the derivative of welding current will exceed a threshold value at the start of a current spike may be used. Due to differences in the maximum rate of change of current with different welding generators, the threshold setting will vary with different generators.

The termination of clipping may also be indicated by the derivative of current. During a current spike, the derivation of current assumes a positive value as current increases, falls to zero value at the peak of current, becomes negative as current decreases, and then returns to zero as constant arcing is reestablished. Accordingly, the start of constant arcing may be indicated by the derivative of current falling below a negative threshold and then becoming greater than the threshold. False termination of clipping may occur using this approach due to "glitches" or aberrations in the current signal during a current spike. Such occurrences may be minimized by the additional requirement for termination of clipping that the value of current be within a threshold level of the current value prior to clipping. Both thresholds above must be carefully adjusted for the particular welding generator being used. Note that the fact that the value of current has returned to within a threshold level of the current value prior to clipping may not be used to terminate clipping. While the constant arcing current value is increasing as a result of approaching a sidewall, the current value following a current spike will be greater than that prior to clipping.

The timing signals which are generated in the logic section of this invention are synchronized with the oscillation of the arc and originate with the sample timer disc or distributor of FIG. 7. An alternative to a disc in combination with two photo emitter-detector pairs is a disc with coded slots in combination with only one photo emitter-detector pair. Referring to FIG. 7, the two sections of disc D which correspond to the sidewall windows are at different radial distances from the center of the disc, each being aligned with the appropriate light emitter and sensor. Obviously, by a different combination of small slits to trigger a signal indicating "right wall" vs. "left wall", or inside wall wall vs. outside wall, the need for duplicate light sources and detectors can be eliminated.

It will be apparent from the foregoing description that the invention is by no means limited to arc welding of joints where one or more upstanding walls run alongside the travel path as in the conventional filling of a gap with weld metal. Nor is the invention limited in application to arc welding. In any situation where a probe or instrument is to be moved along a predetermined path, and in which an electrical signal can be derived which is indicative or representative of lateral spatial position by removing the masking or obscuring signal components, the meaningful signal can be recognized and can be used either to monitor spatial position or to control a device or corrective mechanism, either electrical, electronic or mechanical, etc.

It is intended by the claims which follow, to cover the inventions as broadly as the state of the prior art properly allows. Expressions such as "deviations", referring to the lateral displacement or to an improper width or amplitude of operation will be used in their normal senses, and terms such as signal values, or differential values, which are the elements to be isolated and employed, either to give information of mal-positioning or to lead to the full correction of such, will be well understood by those skilled in the art.

The present application is related, in broad terms, to a copending application Serial No. 702,865 by Jerome W. Nelson, one of the present inventors, filed contemporaneously herewith and assigned to the same assignee. To the extent that the present application discloses method aspects different from those of the copending application, applicants intend that such methods are a part of the present invention.

What is claimed is:

1. In apparatus for performing a welding operation on a work member along a predetermined welding course, which apparatus includes a welding instrument capable of generating a characteristic composite signal having a continuous meaningful component which varies dependently with the lateral position of said instrument with respect to said course and a masking component which tends to obscure the meaningful component, said apparatus also including means for causing the instrument to travel with respect to the work member along said course and means to reciprocate the instrument through variably controllable lateral motion transversely of said course and towards and away from an extreme laterally limited position with respect to the welding course, the improved means for controlling position of the instrument with precision which comprises, in combination, the following elements:
   (a) Means for isolating said continuous meaningful signal component to obtain signal values representative of intermediate as well as laterally extreme instrument positions,
   (b) means for superimposing on the isolated signal values a discontinuous timed signal representative of the instrument being at an extreme lateral position, thereby to obtain a signal surge having a peak or unique value,
   (c) means for comparing said peak or unique value with intermediate instrument position signal values to obtain an instrument position-indicating signal, and
   (d) means responsive to said indicating signal for correcting the instrument position when said signal indicates a need for correction.

2. The improved apparatus according to claim 1 which includes means for comparing signal surges from opposite extreme positions or said instrument to obtain a measure of instrument deviation from said path.

3. The improved apparatus according to claim 1 which includes means for summing the signal surges obtained at opposite extreme positions of said instrument and comparing the sum with a standard, to obtain a measure of instrument deviation from said path.

4. In the method of controlling the lateral position of a welding instrument traveling along a predetermined path or course, wherein a welding current is passed through said instrument and a continuous electrical signal is generated at said instrument and in which the instrument is also reciprocated laterally back and forth across said course to extreme lateral positions defined by a variable amplitude or width of said reciprocation, thereby superimposing on said continuous signal a separate but meaningful signal related to lateral position of the instrument, thus producing a composite signal, the improvement which comprises the following steps, in combination:
   (a) Processing the composite signal to remove components which tend to conceal said meaningful signal, thus obtaining a processed signal having peak values related to each lateral extreme position of the instrument,
   (b) comparing each of said peak values with a minimum value of said processed signal during the previous traverse of the instrument between said extreme positions to obtain a successive series of signal surges,
   (c) deriving the sum and difference of said signal surges to produce error signals, both for centering of oscillation of the oscillation and for controlling the width or amplitude of oscillation or reciprocation, and
   (d) using said error signals to accomplish both the centering and the amplitude of reciprocation control.

5. The method of claim 4 in which said continuous electrical signal represents the welding current and which includes the step of clipping spikes from said composite signal by holding and limiting the value of said composite signal immediately prior to the occurrence of a spike.

6. The method of claim 5 which includes the step of initiating clipping when the welding voltage falls below a threshold level.

7. The method of claim 5 applied to all welding which includes the step of terminating clipping by generating a time out period after the reestablishment of the welding arc governed by the amplitude of the spike above the constant arcing level of said composite signal.

8. The method of claim 5 which includes the step of using the derivative or slope of a spike to control clipping.

9. The method of claim 4 which includes the step of taking a time signal to obtain a specific sample of said processed signal while the instrument is at selected lateral positions.

10. The method of claim 9 in which the sampling time is sufficient in duration to overlap the occurrence of a peak value of said processed signal corresponding to an extreme lateral position.

11. The method of claim 4 in which the minimum value of said processed signal and said signal surges are cyclical and are stored and held for use in later cycles.

12. The method of claim 4 which includes the separate steps of controlling the center point of instrument oscillation and controlling width or amplitude of instrument oscillation.

13. The method of claim 4 which further includes changing the held value of current surges from opposite extreme lateral positions in proportion to the change in position of the instrument resulting from controlling the center point and width of instrument oscillation to produce said error signals which continuously represent the actual deviation in instrument position.

14. The method of claim 13 which further includes deriving incremental feedback signals proportional to the change in position of the instrument resulting from controlling the center point and width of the instrument oscillation by integrating signals derived from the rate of change of instrument position.

15. The method of claim 4 which includes controlling the lateral position of the instrument only when welding is ongoing and said error signals are meaningful.

16. The method of claim 4 in which minimum values in the processed signal are subtracted from the peaks in the processed signal corresponding to the instrument extreme positions for removing slowly varying components of the processed signal.

17. The method of claim 4 in which control of the center point is given priority over control of width or amplitude of reciprocation.

18. The method of claim 4 in which a bias signal is introduced for compensation of a high-low physical condition at the work member, for controlling the position of the instrument in the situation where there is a lack of meaningful signal at one of the instrument extreme positions.

19. Apparatus for welding which includes a welding torch, means for moving said torch along a central welding course, means for reciprocating said torch at a selected frequency and to selective amplitude transversely of said course AND towards a barrier alongside said course, means for adjusting the centering of said reciprocation motion, means for adjusting the width or amplitude of said reciprocation transversely, means for producing a first and continuous signal from the torch including a signal component variably dependent on the proximity of the torch to said barrier, means for extracting from said continuous signal a signal component which is meaningfully related in value to said proximity and having a peak value corresponding to the extreme lateral position of the torch towards said barrier and having a lesser value when the torch is at an intermediate position, timer means for isolating signal surges related the differences between to said peak value and said lesser values, means for comparing said surges with a predetermined value to produce a centering error signal, means for summing signal surges from opposite extreme torch lateral positions of reciprocation and for comparing the sum with a reference value to obtain a width error signal, and means responsive to said error signals for correcting the centering position and the width or amplitude of oscillation respectively.

20. Apparatus according to claim 19 which includes means for filtering from said first named electrical signal frequencies substantially greater than said selected frequency and means for clipping spikes from said signal which tend to obscure said meaningfully related signal component.

21. Apparatus according to claim 20 which includes means for initiating clipping by detecting the drop in welding voltage during arc extinguishment and means for terminating clipping when the voltage on a capacitor proportional to the amplitude of a signal spike above the immediately previous value of said first signal decays through a resistor to a voltage less than a threshold.

22. Apparatus according to claim 19 which includes means for sampling said signal surges, holding said signal surges, and integrating signals derived from the rate of change of instrument position.

23. Apparatus according to claim 19 in which the timer means includes a slotted rotating disc operated by the oscillating means and which includes a light source on one side of said disc and a light sensor on the opposite side for generating timing signals.

* * * * *